United States Patent [19]

DeMarsh et al.

[11] Patent Number: 4,654,496
[45] Date of Patent: Mar. 31, 1987

[54] UNDERWATER OXY-ARC CUTTING SYSTEM USING A NON-THERMIC CUTTING ROD

[75] Inventors: Peter L. DeMarsh, P.O. Box 156, Picayune, Miss. 39466; William W. Crawford, Slidell, La.

[73] Assignee: Peter L. DeMarsh, Houston, Tex.

[21] Appl. No.: 598,661

[22] Filed: Apr. 11, 1984

[51] Int. Cl.[4] .................... B23K 35/04; B23K 35/22
[52] U.S. Cl. ......................... 219/69 R; 148/9.5; 219/69 W; 219/70; 219/72; 219/74
[58] Field of Search .................. 219/69 R, 69 W, 70, 219/72, 69 E, 74; 266/48; 148/9 R, 9.5

[56] References Cited

U.S. PATENT DOCUMENTS

| | | | |
|---|---|---|---|
| 2,210,640 | 8/1940 | Swafford | 219/69 E |
| 2,802,930 | 8/1957 | Ronay | 219/70 |
| 3,260,076 | 7/1966 | Humberg | 431/99 |
| 3,507,230 | 4/1970 | Sieb | 431/99 |
| 3,507,231 | 4/1970 | Meir | 431/99 |
| 3,591,758 | 7/1971 | Clucas | 219/70 |
| 4,069,407 | 1/1978 | Bower | 219/70 |
| 4,147,333 | 4/1979 | Wirth | 266/48 |
| 4,173,499 | 11/1979 | Holemann | 266/48 |
| 4,182,447 | 6/1980 | Bower | 219/70 |
| 4,416,444 | 11/1983 | Bower | 266/48 |
| 4,437,649 | 3/1984 | Rieppel et al. | 266/48 |

FOREIGN PATENT DOCUMENTS

| | | | |
|---|---|---|---|
| 470195 | 12/1950 | Canada | 219/69 R |
| 2501473 | 7/1975 | Fed. Rep. of Germany | 266/48 |
| 2397913 | 3/1979 | France | 266/48 |
| 46-10938 | 3/1971 | Japan | 266/48 |
| 53-5262 | 2/1978 | Japan | 266/48 |

OTHER PUBLICATIONS

"Marine Salvage Operations" Cornell Maritime Press Inc., 1960 at pp. 207–208.
"Commercial Oil–Field Diving", Cornell Maritime Press, 1971 at pp. 151–169.

Primary Examiner—A. D. Pellinen
Assistant Examiner—Geoffrey S. Evans
Attorney, Agent, or Firm—Vaden, Eickenroht, Thompson & Boulware

[57] ABSTRACT

An improved system for underwater oxy-arc cutting of a work piece, and a unique cutting rod used in such cutting work. This rod has an outer ferrous metal tube which contains a metal liner, which liner may in turn be comprised of a plurality of metal wires spaced in a circular pattern along the inner circumference of the tube. Oxygen is passed through a central passageway within the tube near but less than at sonic flows to avoid arc bounce. DC current (200–400 amperes) flows between the rod and work piece to form an arc consuming the rod at a rate between about 0.09–0.20 inches per second. The cross-sectional areas of the tube and the wires are about equal and the central passageway is less than one-half of either the tube or wires in cross-sectional areas. The rod is made (non-thermic) by sealing the tube about the wires or by use of aluminum or copper wires. Optimized parameters in underwater cutting of the work piece is applied, i.e. cutting rate, oxygen consumption, current magnitude and rod consumption. To minimize the consumption of the cutting rod, a nonthermic rod is used so that, upon arc interruption either no burning or slow burning ensues, even with continued oxygen flow.

11 Claims, 7 Drawing Figures

UNDERWATER OXY-ARC CUTTING SYSTEM USING A NON-THERMIC CUTTING ROD

BACKGROUND OF THE INVENTION

1. Field of the Invention

This invention relates to the cutting of materials by high temperature oxidation, and it more particularly relates to systems for underwater oxygen-arc cutting of work pieces.

2. Description of the Prior Art

The technique of arc-oxygen underwater cutting of work pieces (metal, concrete, etc.) has been practiced for many decades. In this operation, a DC or AC current is passed between a cutting rod and the work piece as the other terminal of the system to establish an arc. Simultaneously with the arc, a flow of oxygen down the rod causes oxidation at very high temperatures which readily cuts steel, other metals, rock, concrete and other materials. The rod not only serves to apply the arc and oxygen to the work piece, but also can be used as a gouging, prying and picking tool by the diver performing the underwater cutting work.

The rod has been a ferrous metal tube filled with metallic wires surrounding an oxygen flow path, and these wires can be iron and other ferrous alloys, copper, aluminum, magnesium and various mixtures of these metals. The rods were supposedly designed for certain underwater cutting purposes as to size, length and metal compositions.

Usually, the rod was of a construction to be used at 300–400 ampere current flows with an oxygen pressure (at the rod) of about 100 PSI above water pressure at the depth of the work piece. The current magnitudes and oxygen pressures have been varied by whim, prejudice or preference of the diver to complete the underwater cutting work in the best and quickest manner.

Various rods have been used and range from a simple 5/16 inch OD steel tube, 14 inches long with an axial bore of about ⅛ inch to composite rods alleged to have a thermite effect. The latter rods include a "Thermal Lance" which was a ⅜ inch pipe, 10 feet, 6 inches long that was packed with a number of different metal alloys, such as aluminum, magnesium, thermite and steel. When the Thermal Lance rod was ignited and oxygen flow established through it, the rod burned with tremendous heat which was claimed to reach a temperature of 10,000 degrees for about six minutes. The rods can be extinguished only by shut-off of the oxygen flow. The Thermal Lance rod was marketed under the name "Burning Bar".

Reference for these rods may be taken to the literature references "Marine Salvage Operations", Cornell Maritime Press, Inc., 1960 at pages 207–208 and "Commercial Oil-Field Diving", Cornell Maritime Press, Inc., 1971, at pages 151–169.

The following patents also describe various cutting rods some of which may be used in underwater oxy-arc cutting work:

2,802,390　B. M. Ronay　Issued 8/13/75　(Class 219)
Showing a cast iron alloy tubular rod;
3,260,076　W. Humberg　Issued 7/12/66　(Class 431)
Showing a steel burner pipe filled with steel and magnesium wires;
3,507,230　H. A. Sieb　Issued 4/21/70　(Class 431)
Showing a composite rod of a steel tube filled with low carbon steel and aluminum rods;
3,507,231　R. Meir　Issued 4/21/70　(Class 431)
Showing a composite rod similar to Seib but with an annular groove/ring to secure the wires to the burner pipe;
3,591,758　R. Clucas　Issued 7/6/71　(Class 219)
Showing a flexible composite rods having a plastic sheath filled with steel wires surrounding the oxygen passageway;
4,069,407　J. S. Bower　Issued 1/17/78　(Class 219)
Showing a composite rod identical to Seib or Meir but having a mixture of steel and aluminum or titanium, or alloys thereof for a "thermite effect" burning rod which can be extinguished after ignition only by shut-off of the oxygen flow; and
4,182,947　J. S. Bower　Issued 6/8/80　(Class 219)
4,416,444　J. S. Bower　Issued 11/22/83　(Class 219)
Shown with composite rod like 4,069,407 but with non-ferrous coated steel tubing to produce "thermite effect" in a burning rod even with current supply interrupted.

In summary, the past use of cutting rods in underwater oxy-arc work left the design of the rods and other cutting parameters (sizes, current, gas flow) much to chance as long as the rods did the work. For example, many rods were designed to continue burning (thermite effect) once ignited even though the arc was quenched by interrupting current flow. Only oxygen shut-off stopped the continued high rate consumption of these rods. Since the object of underwater cutting is to burn-cut the work piece and not the rod, these rods were inefficient, especially the "Thermite Effect" type of rods.

The tubular cutting rod life should be spent in cutting the work piece since the divers time is limited, very expensive because of his great specialized skills, and the pressing need to complete the underwater cutting work. Also, frequent replacements of self consuming cutting rods is not a desired hobby of the diver.

In the same regard, the cutting rod and cutting system should be optimized for the fastest cutting with the least diver time, oxygen and current consumed, and with the best cutting rod life.

The present improved system for underwater oxy-arc cutting of a work piece, and the unique rod used in such work, are directed to the above-recited optimization.

SUMMARY OF THE INVENTION

In accordance with this invention, there is a provided a system for underwater oxy-arc cutting of a work piece using a tubular rod carrying a flow of oxygen into an arc to the work piece from a DC or AC current flow. The rod is a metal tube with an integral metal liner (wires or sheath) about its interior and enclosing a round central passageway for oxygen flow. The oxygen flow is near but less than sonic flow to avoid arc bounce. The current is 200–400 amperes so the rod consumption is 0.09–0.20 inches per second. The tube and liner have substantially equal cross-sectional areas whereas the passageway is not greater than one-half the cross-sectional area of the tube or liner.

In a preferred embodiment of the rod, the tube is steel and the liner is a plurality of metal (steel or aluminum) wires in a circular pattern about the interior of the tube. The rod is non-thermic (arc interruption greatly reduces burning) and provides optimum cutting efficiency.

DESCRIPTION OF THE DRAWINGS

In these drawings, the several embodiments have common elements of construction in the cutting rods. In the several figures, like elements carry like numerals to simplify description of these cutting rod embodiments used in the present system for underwater oxy-arc cutting of a work piece.

DESCRIPTION OF PREFERRED EMBODIMENTS

Figure 1:
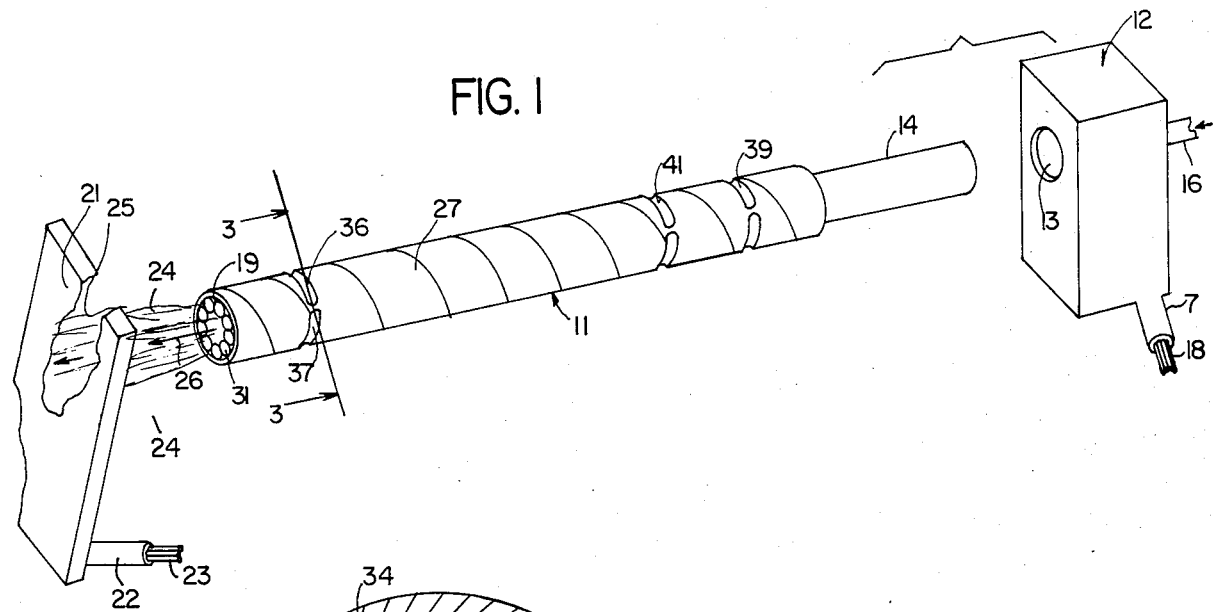
FIG. 1 is a perspective view of one embodiment of a cutting rod for underwater oxy-arc cutting of a work piece ready for insertion into a torch holder.
Figure 2:
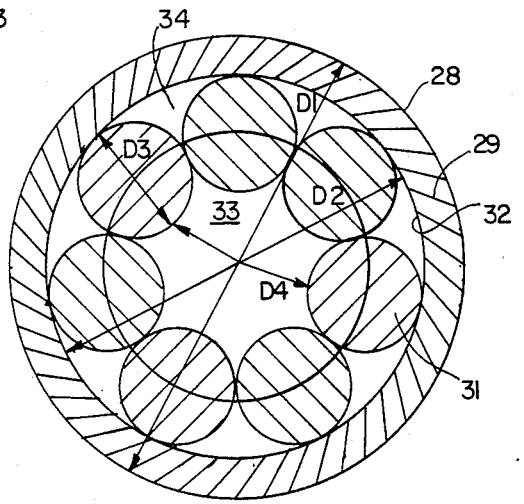
FIG. 2 is an end view of the cutting rod.

Referring to FIGS. 1 and 2, there is shown a cutting rod 11 which is used with a torch holder 12 that can be of conventional design. The holder 12 has an opening 13 into which one end 14 of the rod is releaseably secured by a suitable clamping mechanism that provides a gas seal and proper electrical connection. A supply of oxygen gas at high pressure is delivered by a flexible hose 16 to the holder 12. An insulated cable 17 with a heavy conductor 18 connects the holder to a welding machine or other source of DC or AC current. As a result, the rod 11 receives a flow of oxygen gas and a DC current is passed through the rod 11 to a work piece that lays at some underwater depth.

With current and oxygen flowing through the rod 11, the end 19 thereof is touched to the work piece 21 that is also connected into the current source by an insulated cable 22 having a heavy conductor 23. As a result, an arc (designated by lines 24) is established between the work piece 21 and the rod end 19. The resultant increase in temperature of the work piece 21 (e.g. a ½ inch thick steel plate) quickly reaches the melting point with the oxygen flow (designated by arrow 26) producing an exothermic reaction and a jet action to blow the molten metal from the work piece to produce the cut opening 25. Naturally, the rod tip 19 is also consumed but at a lesser rate than the work piece on an equal mass basis. For safety, the exterior of the rod 11 is covered by a thin wrap 27 of insulative plastic tape from the end 19 to adjacent the unwrapped end 14 received in the holder 12.

The rod 11 is constructed of an outer ferrous metal tube 28 which integrally carries a metal liner about its inner circumference within its sidewall 29. The liner can be a plurality of metal wires 31 which are arranged in a circular pattern against the interior surface 32 of the tube 28.

Although the wires 31 are usually of uniform diameter, they can be of varying sizes as long as they function properly in the rod 11 as will be apparent from this description. The wires 31 enclose a round passageway 33 through which the oxygen flows from the holder 12 to the work piece 21.

The flow of oxygen is adjusted by the cross-sectional area of the passageway 33 and the length of the rod 11 so as to be near but not greater than sonic flow where shockwaves are generated within the arc 26 which causes it to bounce and reduce cutting efficiency. This oxygen flow is produced by a pressure that is about 100 PSI above the hydrostatic head of the water at the depth of the work piece.

The magnitude of the DC or AC current producing the arc 24 is between 200–400 amperes, and usually is held to about 300 amperes, with good cutting efficiency for the rod 11, as described herein.

Figure 3:
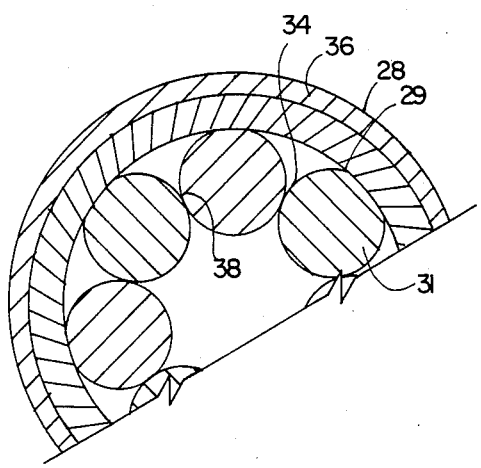
FIG. 3 is a cross-section of the cutting rod taken along line 3—3 of FIG. 1.

The wires 31 are secured integrally within the tube 28 so as not to be loose sufficiently to mechanically move or provide a poor electrical connection between the wires, tube and the holder. Preferably, the wires 31 are secured into the tube 28 in a manner that substantially all of the oxygen must flow only through the passageway 33. For this purpose, the sidewall 29, as can be seen in FIG. 3, is deformed radially inwardly to fill the spaces between the wires 31 and the interior surface 32.

If the wires 31 are similar in ductibility to the tube 28, a crimp arrangement is provided. This arrangement can be a circumferential crimp, one or more individual crimps, such as a pair of semi hemispherical crimps 36 and 37 formed into the rod 11. As a result, the wires 31 are deformed sufficiently to produce flattened tangent sealing surfaces 38 by the crimping action and leave only minute (if any) between wire openings 34 along the surface 32.

With proper arrangement in the tube, wires and openings, the sealing of the wires within the tube as by the crimps 36 and 37 produces a self quenching cutting rod. However, the openings 34 should allow only an inconsequential flow of oxygen between the wires and the tube.

The cutting rod 11 should be provided with several semispherical crimped pairs 39 and 41 which can be placed between the ends 14 and 19.

The cutting rod 11 is non-thermic whenever the arc 26 is interrupted, as by removal from the work piece 21 or current shut off, and simultaneously burning of the cutting rod decreases substantially to a low burning rate while the flow of oxygen continues. As a result, the diver can separate the rod from the work piece to check cutting work without wastefully letting the cutting rod burn itself out in a few seconds. If cutting is to be resumed, the end 19 is touched to the work piece 21 and cutting resumes.

Analysis of the oxy-arc cutting action shows that the heat from burning the work piece is the major heat source to do cutting work. Likewise, the heat from the cutting rod is needed only to start the burning action on the work piece. However, the arc 24 does require a consumption by burning of the cutting rod 11. Furthermore, the rod 11 can be arranged to provide efficient heat generation by proper selections of the tube, wires and passageway relationships whereby the rod is consumed at a rate of between about 0.09 and about 0.20 inches per sec during existence of the arc 24.

More particularly, the rod 11 should be constructed with the tube and wires having a cross-sectional area substantially equal. The passageway 33 should have a cross-sectional area not greater than about one-half of the lesser of the cross-sectional areas of either the tube or the wires. This relationship is required if the tube and wires are ferrous metal (e.g. low carbon steel) or if the wires are aluminum or copper.

Good results have been obtained where the tube is steel tubing and the wires are also steel. The same construction using a steel tube with aluminum wires produces nearly the same efficient cutting work but is non-thermic even if substantial oxygen flows through the openings 34 relative to passageway 33.

The metal liner in the steel tube 28 does not have to be entirely aluminum for this result. The amount of aluminum or copper in the wires 31 needs only to be sufficient to provide a molten aluminum flux barrier at the end 19 when the arc 26 is broken so that the steel tube is temporarily isolated from the main oxygen flow in passageway 33. The amount of this non ferrous metal in the liner or the wires 31 needs only to be above about 50 percent of the wires cross-sectional area. Irrespective of the amount of aluminum in the liner formed by the wires 31, the cutting rod 11 never exhibits the "Thermite" effect of high temperature burning in the absence of the arc 24 but during oxygen flow.

The several dimensions (diameters) the tube 28, wires 31 and passageway 33 are designated respectively, $D_1$, $D_2$, $D_3$ and $D_4$ to correlate to subsequent described working examples.

Figure 4:
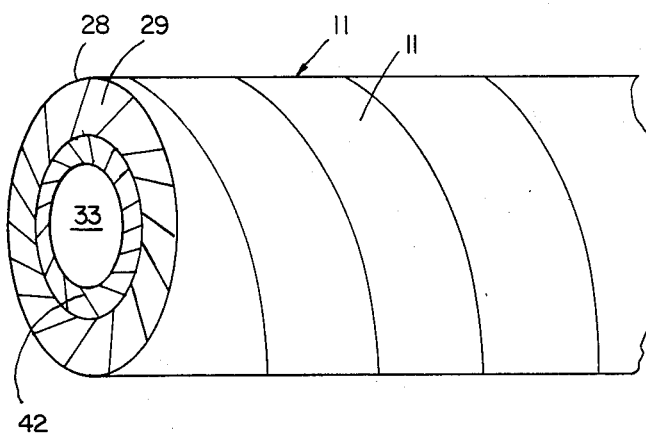
FIG. 4 is a partial perspective of a second embodiment of a cutting rod used in the present system of underwater oxy-arc cutting.
Figure 5:
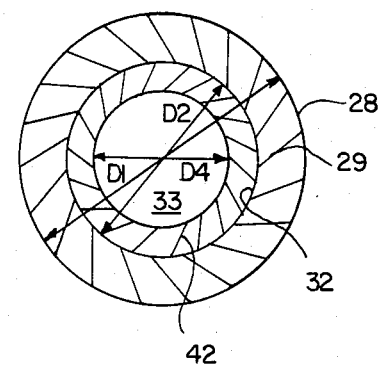
FIG. 5 is an end view of the second cutting rod.

Referring to FIGS. 4 and 5, there is shown another form of the cutting rod 11 wherein the liner within the tube 28 is provided by a second metal tube 42 that is integrally secured into the tube 28. If the tube 42 is of a non ferrous metal such as aluminum or copper arranged by cross-sectional areas according to the embodiment of FIGS. 1 and 2, the rod 11 will be self quenching. If desired, the tubes 28 and 42 can be secured together by crimps, such as the crimps 36 and 37. For example, the tube 28 can be formed of copper plated hydraulic tubing. However, the steel tubing and the wires 31 can be copper plated, or otherwise clad with a thin layer of the non ferrous metal. There does not appear to be any operational difference in electrical resistance of the rod between the plated type in comparison to the other types such as the clad type. The non ferrous coating doesn't appear to provide significant corrosion protection because of pin-holes therein.

The several diameters of the tubes and passageway are indicated respectively as $D_1$, $D_2$ and $D_3$ which are correlated to the following described working examples.

Figure 6:
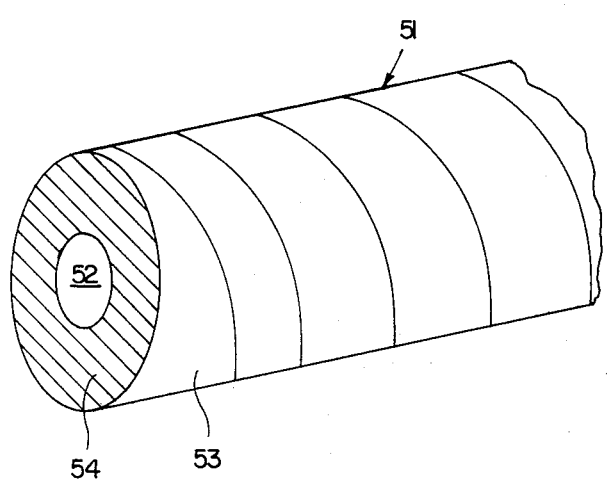
FIG. 6 is a partial perspective of a prior art cutting rod used in underwater oxy-arc cutting work.
Figure 7:
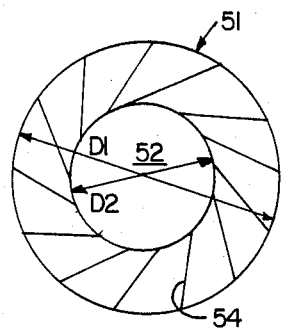
FIG. 7 is an end view of the prior art cutting rod.

A prior art rod 51 is shown in FIGS. 6 and 7. The rod 51 is cast or extruded through a die to provide a central round passageway 52 extending its length. The rod 51 may have an insulative wrap 53. The rod 51 may have the sidewall 54 of a ferrous metal alloy such as 95 percent iron and the remainder of aluminum and copper. The several diameters $D_1$ and $D_2$ are indicated to correlate to the following working example.

Cutting rods in accordance with the several figures were constructed and subjected to comparative testings. These rods A, B, C, D and E respectively correspond to the Figures listed in the following table I. The tests were made under the indicated parameters for underwater cutting on a ½ inch thick steel plate and at 300 amperes of DC current through the arc at the listed oxygen pressure applied by the holder at the rod. In summary, these tests duplicated actual underwater oxy-arc cutting of the steel plate by an experienced diver.

The rods A, B and C having cross-sectional areas between the steel tube and metal wires between the ratios 7/5 and 5/7 with the oxygen passageway being between 10 and 20 percent of the lesser cross-sectional area of either the steel tube or the wires.

TABLE I

| ROD TYPE- | DESCRIPTION | ROD BURN RATE (IN/SEC) | STEEL CUT RATE (IN/SEC) | OXYGEN USE PER IN ROD (CU FT/IN) | OXYGEN USE PER IN STEEL CUT (CU FT/IN) | OXYGEN PRESSURE USED PSI | ROD BURNS W/O CURRENT AFTER ARC IS STRUCK |
|---|---|---|---|---|---|---|---|
| A- FIGS. 1-3 | STEEL TUBE $D_1 = 0.375''$ $D_2 = 0.319''$ STEEL WIRES (7) $D_3 = 0.094''$ $D_4 = 0.131''$ | .186 | .545 | .645 | .220 | 100 | YES |
| B- FIGS. 1-3 | STEEL TUBE $D_1 = 0.0375''$ $D_2 = 0.319''$ ALUMINUM WIRES (7) $D_3 = 0.094''$ $D_4 = 0.131''$ | .185 | .592 | .649 | .202 | 100 | NO |
| C- FIGS. 1-3 | STEEL TUBE $D_1 = 0.500''$ $D_2 = 0.319''$ STEEL WIRES (7) $D_3 = 0.94''$ $D_4 = 0.131''$ | .220 | .435 | .590 | .298 | 100 | YES |
| D- FIGS. 6 & 7 | STEEL TUBE $D_1 = 0.313''$ $D_2 = 0.182''$ | .092 | .299 | 1.52 | .468 | 60 | NO |
| E- FIGS. 6 & 7 | STEEL TUBE $D_1 = 0.313''$ $D_2 = 0.123''$ | .094 | .189 | .674 | .355 | 30 | NO |

The prior art rods D and E have the oxygen passageway between about 60 percent and about 20 percent, respectively, of the total annular steel cross-sectional area. It is noted that the rod E approaches the efficiency of the rods A, B and C but uses more oxygen for less cutting work. If the passageway in the rod E were yet decreased into the range of the rods A, B and C, its efficiency would increase.

However, the construction of the rods D and E with a solid annular steel wall 54 about the passageway 52 show the self quenching effect as has been described for the unique cutting rod 11.

From the foregoing, it will be apparent that there has been provided an improved system for underwater oxy-arc cutting of a work piece using a unique cutting rod. Various changes or alterations may be made in this system and rod without departing from the spirit of this invention. These changes are contemplated by the claims and are within their scope and these claims define the present invention. Additionally, the present invention is intended to be taken as an illustration of this invention.

What is claimed is:

1. A system for the underwater oxy-arc cutting of material wherein a tubular rod carrying a flow of oxygen is energized by electric current creating an arc to the material thereby rapidly penetrating same, the improvement comprising:
   (a) a tubular cutting rod comprising an outer ferrous metal tube enclosing an annular metal liner means residing securely about the inner circumference of said tube and enclosing a round passageway adapted to carry a flow of oxygen through the length of said tube, said liner means being consisted of ferrous metal whereby said rod is non-thermic and sustains combustion only at very low burning rates after termination of the arc;
   (b) a source of oxygen connected to said rod and said oxygen having a flow rate approaching but not greater than sonic flow at the arc end of said rod whereby shock waves are avoided in the region of the arc which causes excessive bounce of the arc between said rod and the material being cut;
   (c) a course of current connected between said rod and said material to provide a sufficient current magnitude to initiate and sustain the arc and the current magnitude residing between 200 and 400 amperes so that said rod is consumed at a rate between about 0.09 and about 0.20 inches per second of arc.

2. The system of claim 1 wherein said liner means comprises a plurality of metal wires arranged in a circular pattern about the interior circumference of said tube.

3. The system of claim 1 wherein said metal liner means occupies more than one-half of the cross-sectional area within said tube.

4. The system of claim 1 wherein said passageway occupies at least 10 percent but not more than 20 percent of the cross-sectional area of said tube.

5. The system of claim 2 wherein said tube is integrally secured to the exterior surfaces of said wires whereby substantially all oxygen must flow through said passageway.

6. The system of claim 1 wherein said liner means is a second metal tube received securely within said tube.

7. The system of claim 2 wherein pairs of semi hemispherical crimps are made from opposite sides into said tube adjacent its ends to prevent longitudinal oxygen flow through interstitial spaces between said tube and said wires whereby said rod is non-thermic after termination of the arc but with continued oxygen flow.

8. An underwater oxy-arc tubular cutting rod comprising:
   (a) an outer ferrous metal tube of sufficient wall thickness and rigidity to allow adequate mechanical stiffness for gouging, prying and poking of an underwater work piece;
   (b) an annular metal liner means integrally residing securely about the inner circumference of said tube, enclosing a round passageway adapted to carry a flow of oxygen through the length of said tube and consisted of a non-ferrous metal whereby such rod is non-thermic after termination of the arc but with continued oxygen flow;
   (c) one end of said tube providing a cylindrical surface for releasable attachment into an electrode holder and source of oxygen gas under pressure;
   (d) said tube carrying an insulating covering along its length except for said one end for attachment into an electrode holder; and
   (e) means securing said liner means to said tube whereby substantially all oxygen must flow through said passageway.

9. The cutting rod of claim 8 wherein said liner means is a second metal tube mounted concentrically within said tube.

10. The cutting rod of claim 8 wherein said liner means comprises a plurality of wires arranged in a circular pattern about the interior circumference of said tube and pairs of semi-hemispherical crimps are made into said tube adjacent its ends for preventing longitudinal oxygen flow through interstitial spaces between said tube and said wires.

11. The cutting rod of claim 8 wherein said passageway occupies at least 10 percent but not more than 20 percent of the cross-sectional area of said tube.

* * * * *